Dec. 30, 1930.   H. CARLE   1,786,476
BLANK FEEDING AND GLUING DEVICE
Original Filed Oct. 18, 1926    10 Sheets-Sheet 4
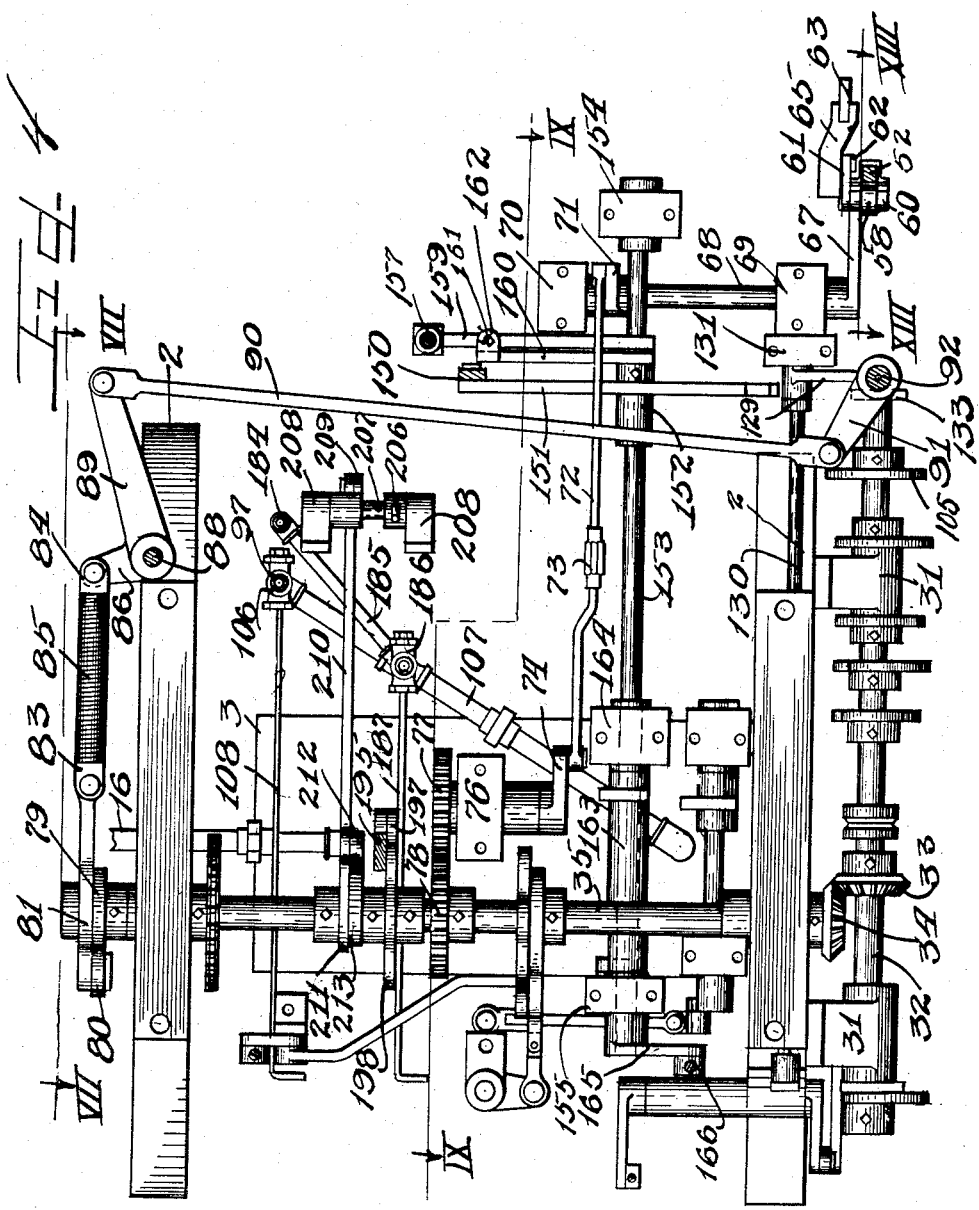
Inventor
Harold Carle
Charles Hill
by                 Attys.

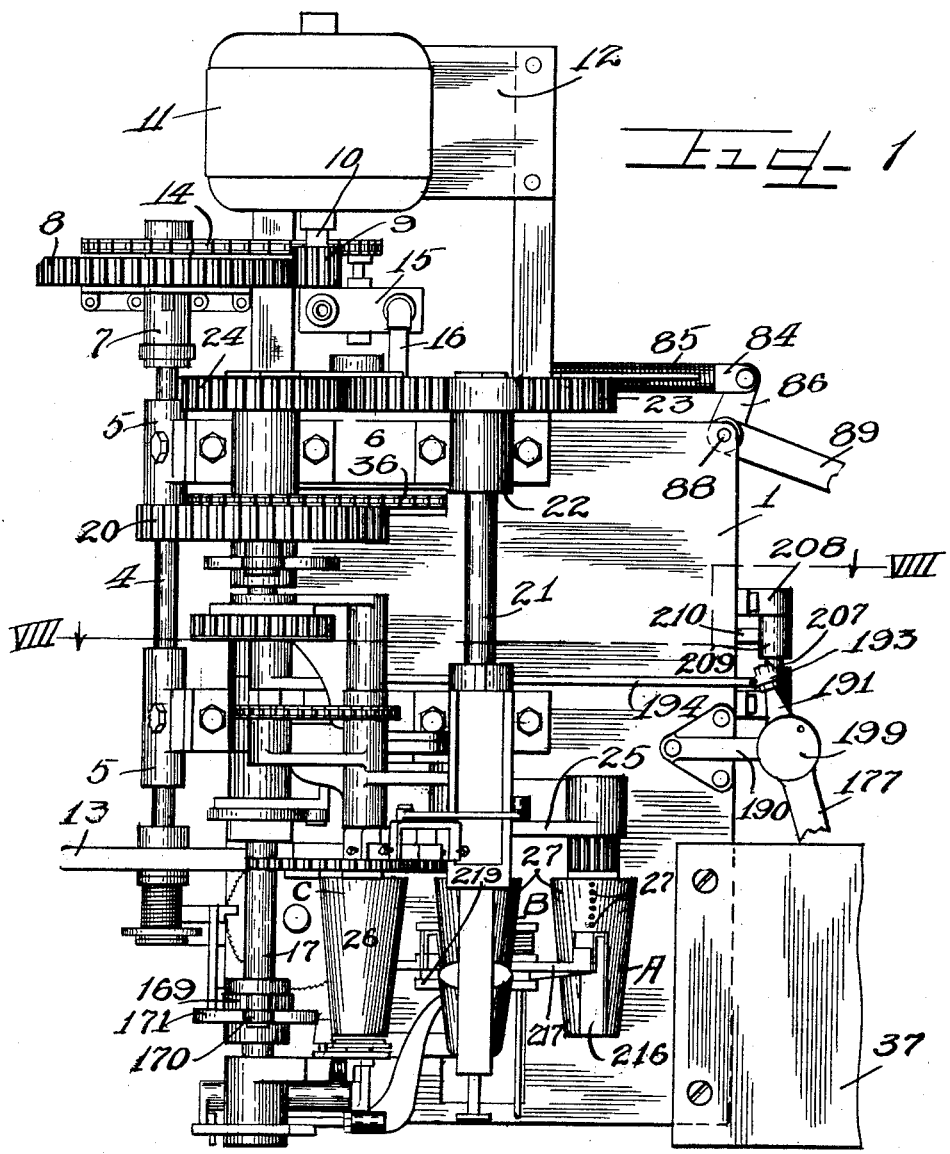

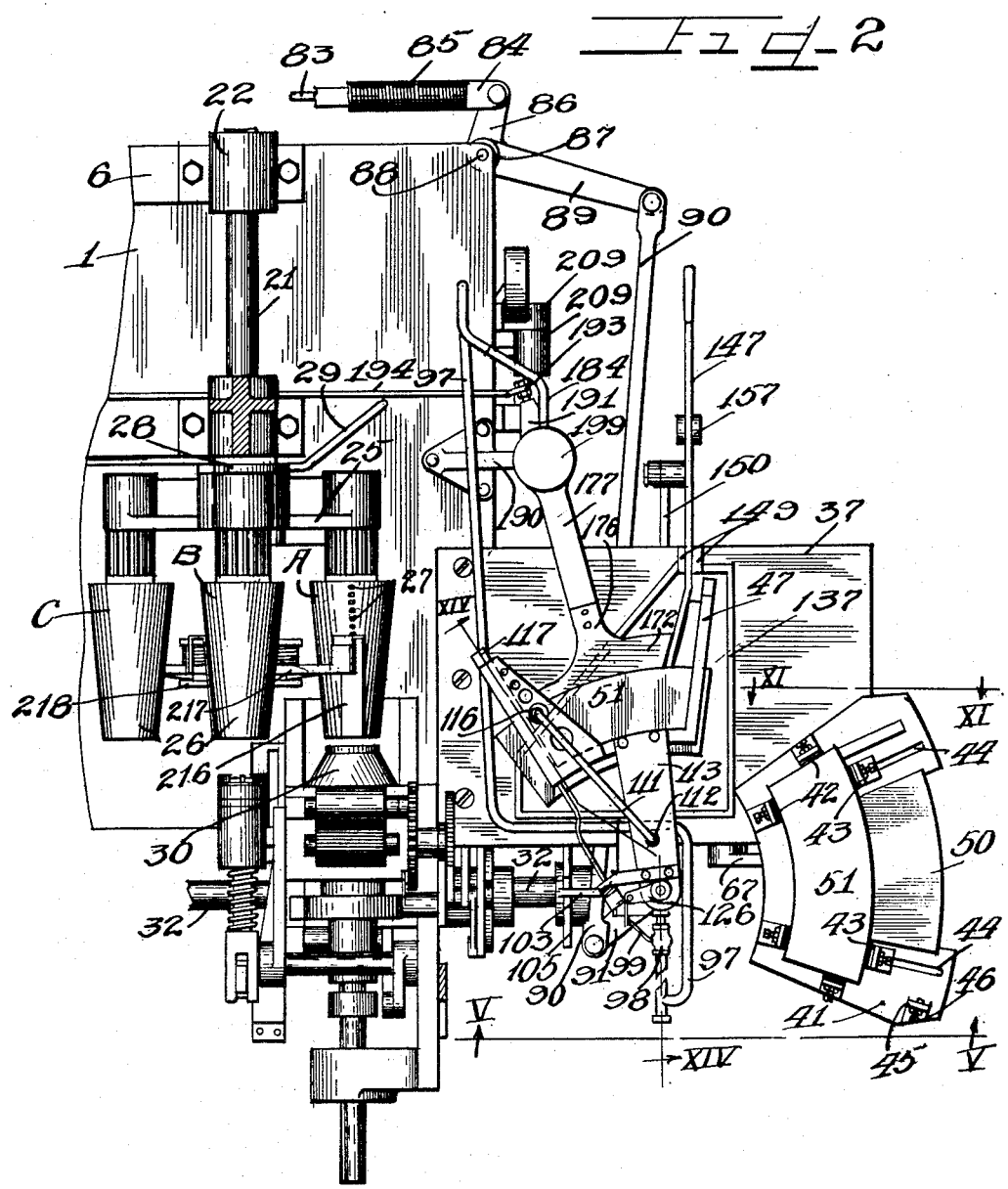

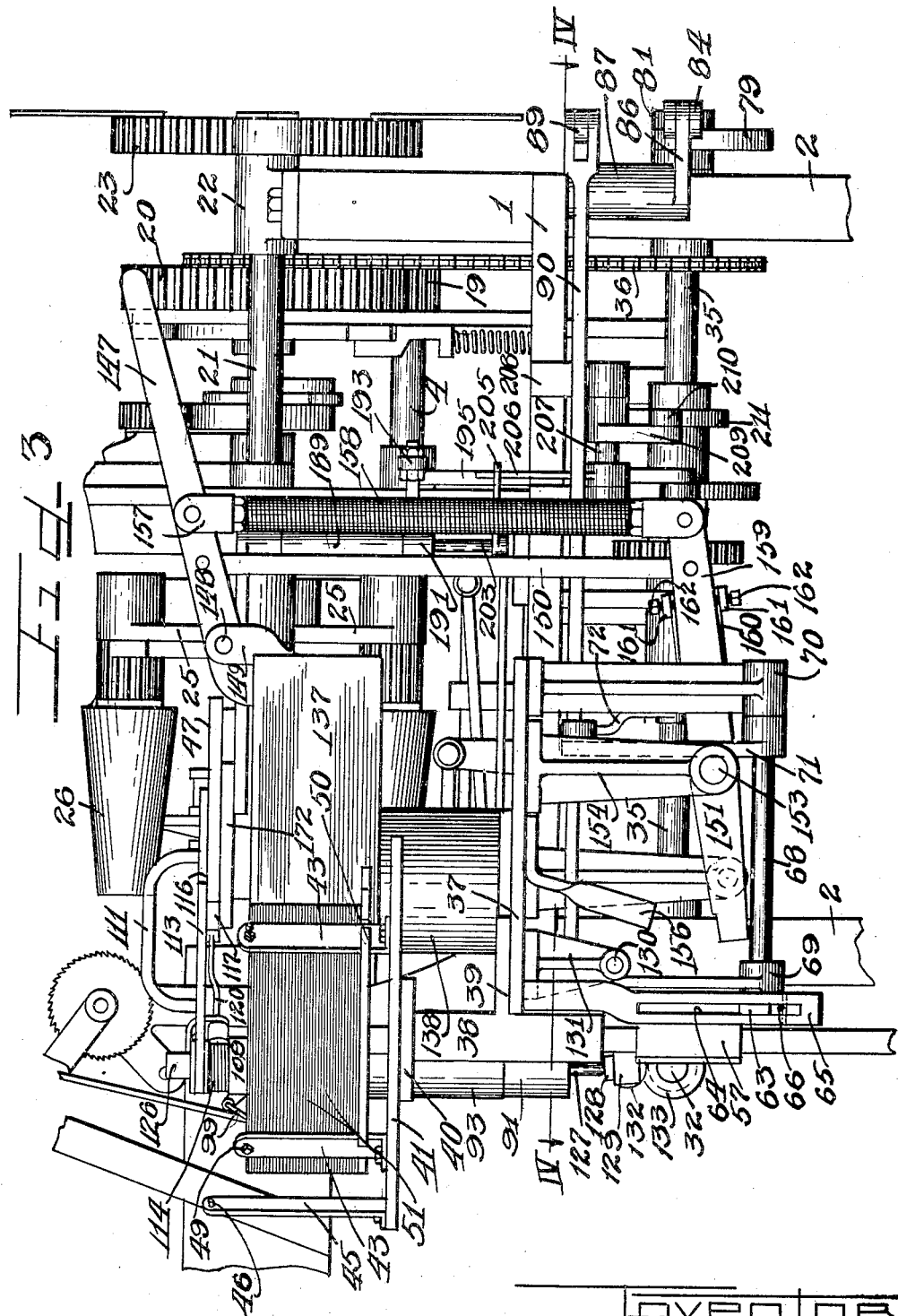

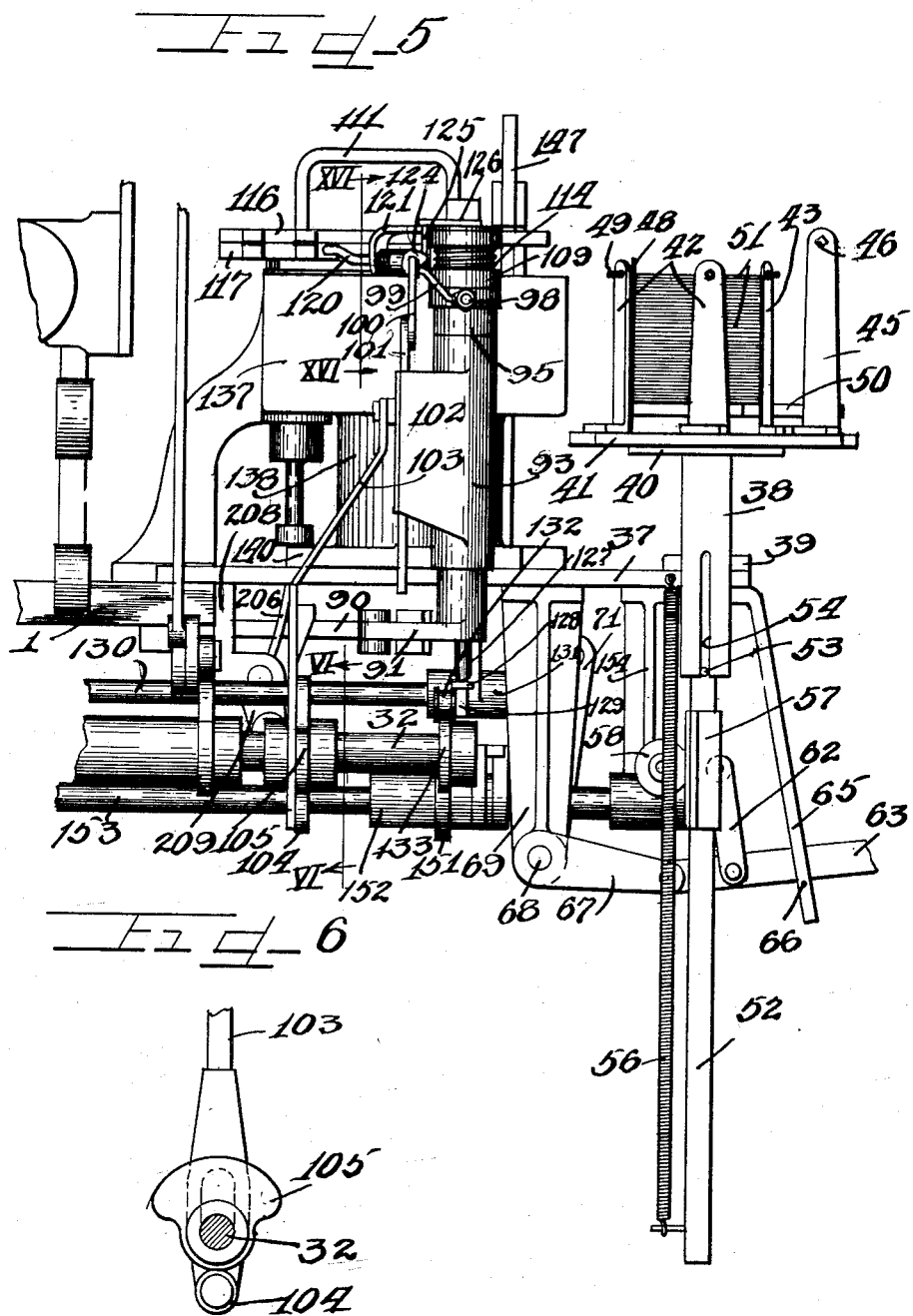

Dec. 30, 1930.  H. CARLE  1,786,476
BLANK FEEDING AND GLUING DEVICE
Original Filed Oct. 18, 1926    10 Sheets-Sheet 6
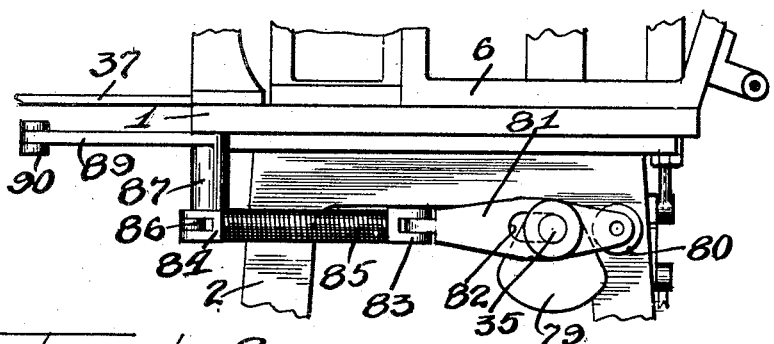
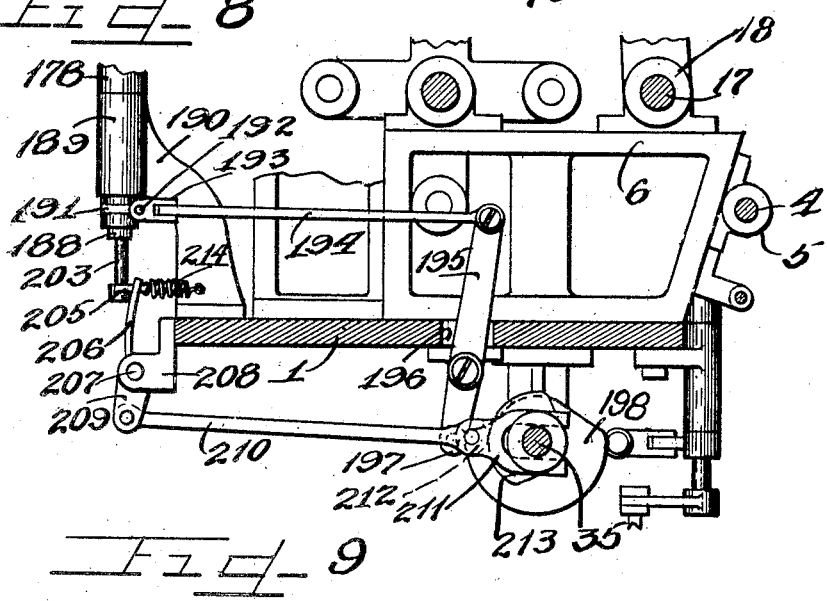
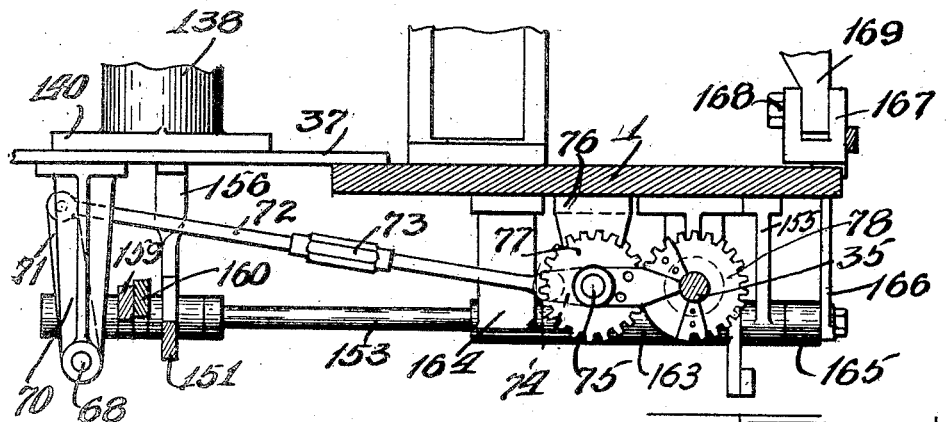
Inventor
Harold Carle
by Charles Hill
Attys

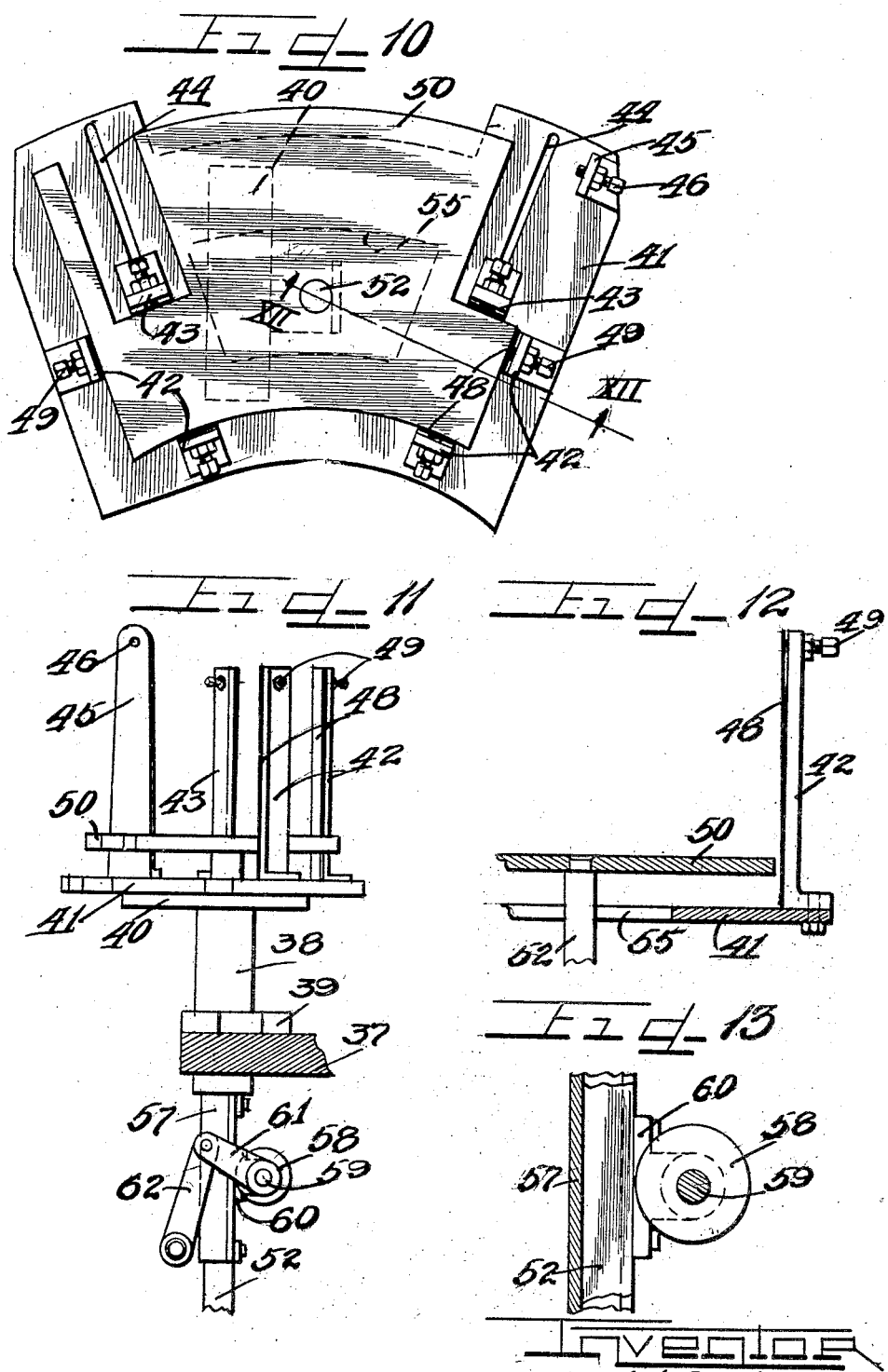

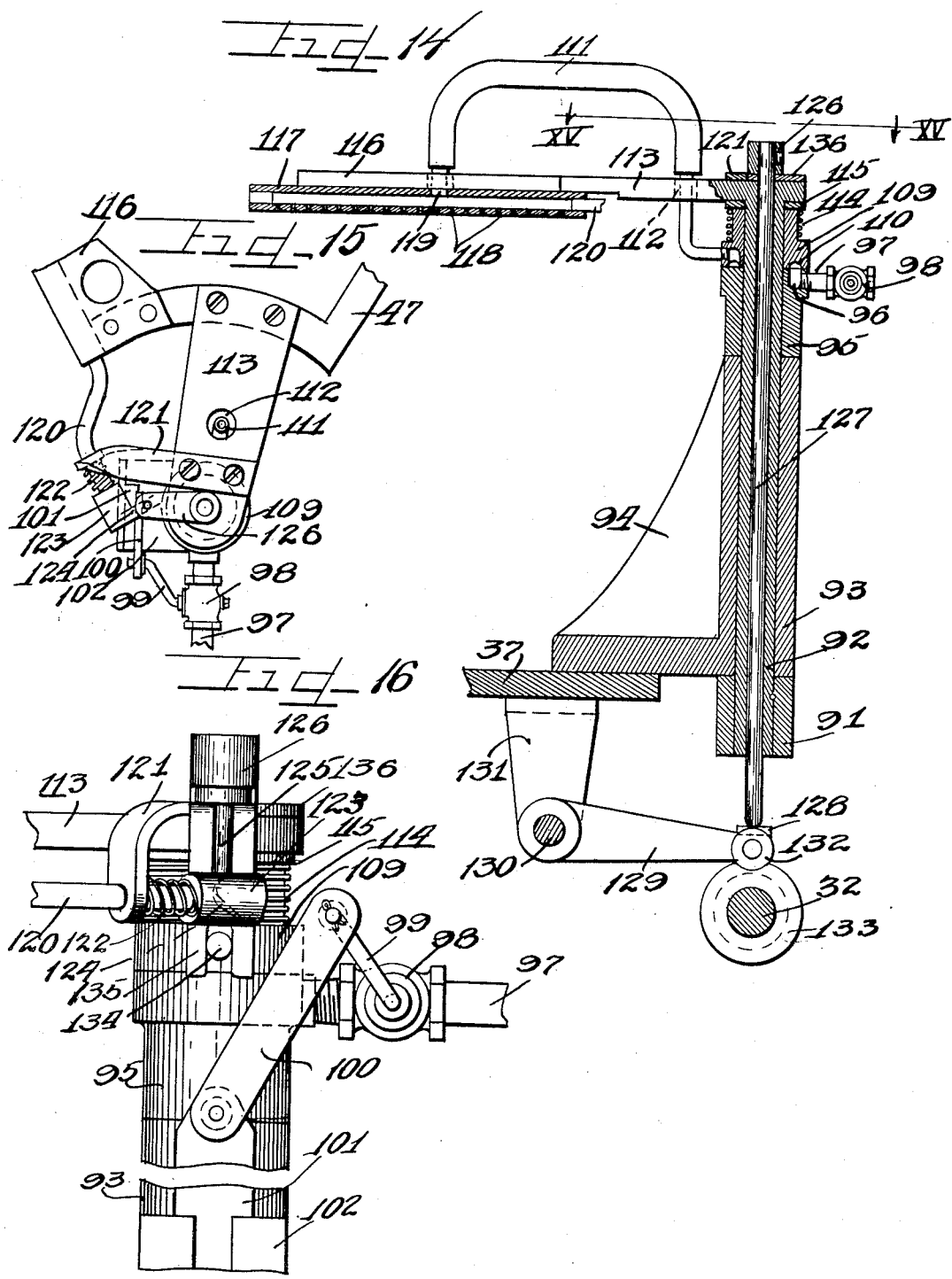

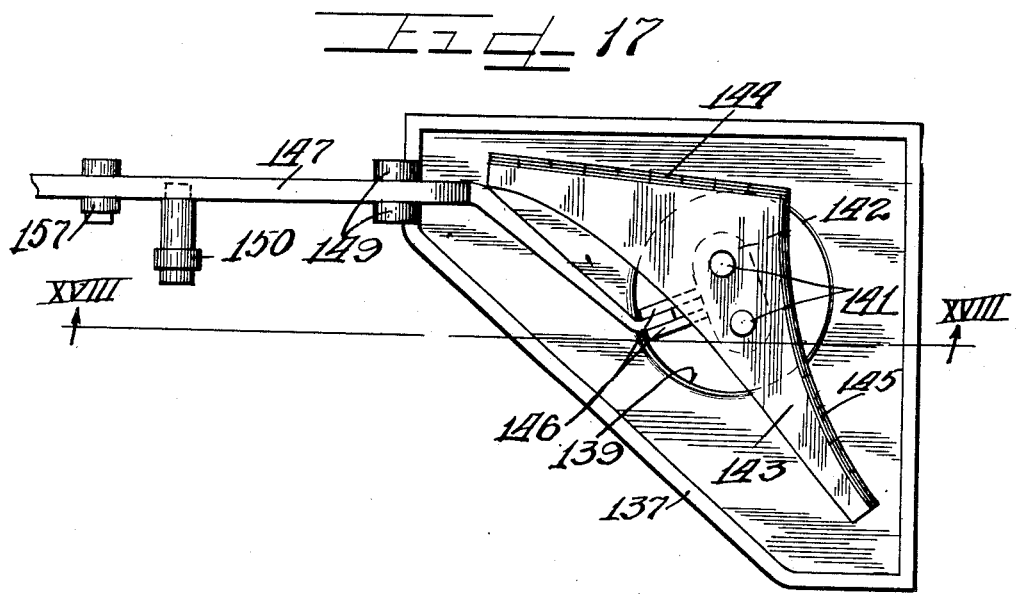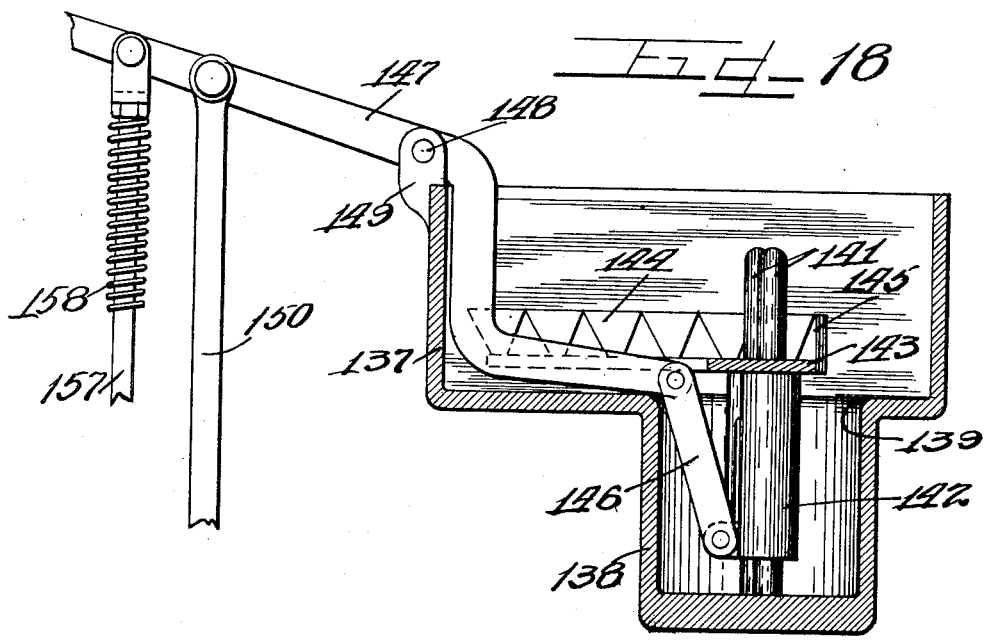

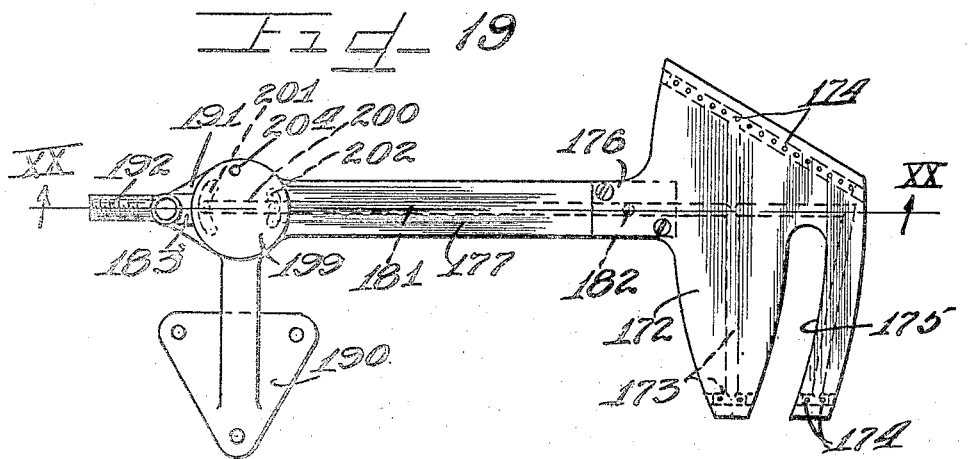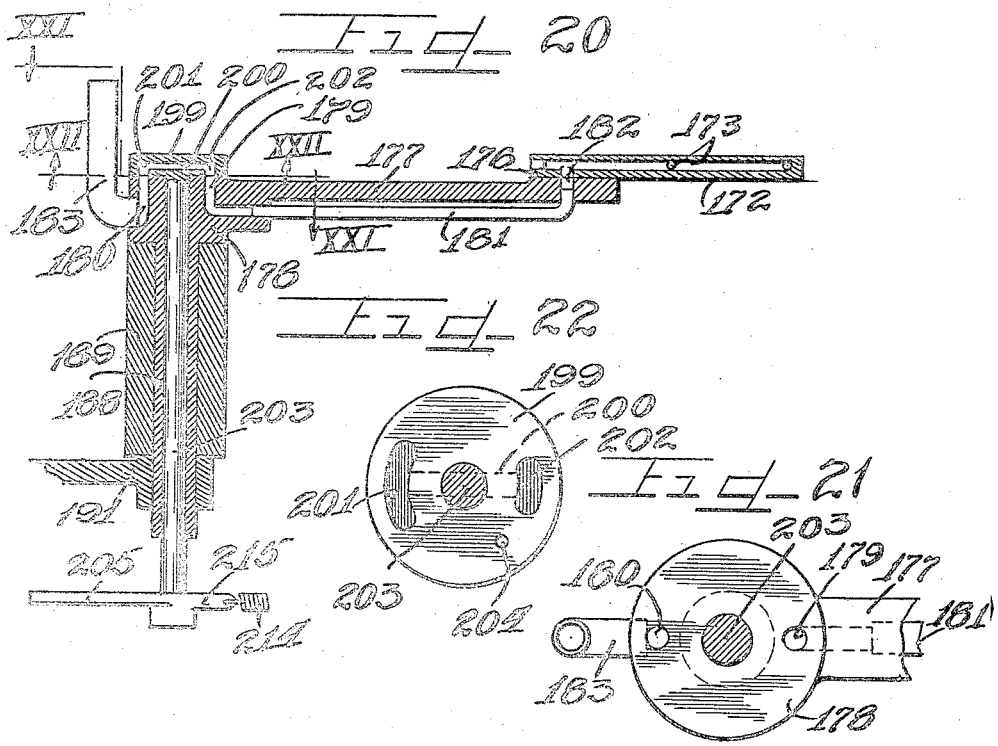

Patented Dec. 30, 1930

1,786,476

UNITED STATES PATENT OFFICE

HAROLD CARLE, OF BUFFALO, NEW YORK, ASSIGNOR, BY MESNE ASSIGNMENTS, TO VORTEX CUP COMPANY, OF CHICAGO, ILLINOIS, A CORPORATION OF DELAWARE

BLANK FEEDING AND GLUING DEVICE

Original application filed October 18, 1926, Serial No. 142,370. Divided and this application filed December 12, 1927. Serial No. 239,436.

This invention relates to improved cup blank feeding and gluing devices and is a division of my co-pending application for patent for a "Flat bottom cup making machine," filed October 18th, 1926, U. S. Serial No. 142,370.

The present invention relates to a paper cup making machine and more particularly to improved paper cup body blank feeding and gluing devices for automatically removing cup body blanks from a magazine, transferring the blanks to an automatic adhesive applying device and then delivering the adhesived blanks into position to be gripped by cup forming mandrels.

It is an object of this invention to provide a flat bottom cup forming machine with improved pneumatic blank feeding means adapted to pneumatically grip and remove a blank from a supply magazine and then carry said blank into a position over an adhesive applying mechanism which acts to automatically stamp the blank with adhesive, after which the blank is released and gripped by a secondary feed mechanism adapted to advance the adhesived blank into the field of operation of cup forming mandrels.

It is also an object of this invention to provide a cup making machine with a magazine having an adjustable blank supporting bottom adapted to automatically raise cup blanks into a position to permit the uppermost blank to be pneumatically gripped by a transfer block which is adapted, in turn, to be automatically moved at a predetermined time into a position wherein the transferred blank is positioned above an automatically acting gluing device, to permit strips of glue to be stamped on the blank in time to permit a cup body blank feed mechanism to engage and feed the glued blank to forming mechanisms with the release of the glued blank by said transfer mechanisms.

It is a further object of this invention to provide a cup forming machine with a plurality of feed mechanisms operable between a blank holding magazine and a gluing device, and between said gluing device and cup forming mandrels whereby cup blanks, as they are being transferred from the magazine to said forming mandrels, are interrupted in their course of travel to permit adhesive to be automatically stamped thereon prior to the delivery of said blanks to the forming mandrels.

It is an important object of this invention to provide a cup forming machine with improved pneumatically controlled transfer and gripping devices adapted to act at predetermined times for the purpose of removing blanks from a magazine, transferring said blanks to an adhesive applying mechanism, then releasing said adhesived blanks to permit the same to be pneumatically gripped by additional feed mechanisms which, in turn, act automatically to deliver the adhesive blanks into the cup forming machine proper to be formed into cups.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary top plan view of a flat-bottom cup-forming machine with which the improved blank feeding mechanisms and gluing devices, embodying the principles of this invention, are adapted to be associated.

Figure 2 is a fragmentary top plan view of another portion of the machine, illustrating a top plan view of the improved blank supporting, blank transfer and blank gluing mechanisms forming the subject matter of this invention.

Figure 3 is a fragmentary right side elevation of the machine with parts omitted.

Figure 4 is a fragmentary horizontal sectional view beneath the machine table taken on line IV—IV of Figure 3.

Figure 5 is a vertical front view of the body blank magazine and feed mechanisms taken on line V—V of Figure 2.

Figure 6 is a fragmentary detail taken on line VI—VI of Figure 5, illustrating the cam mechanism which controls the pneumatic operating means of the body blank transfer arm.

Figure 7 is a vertical detailed view taken on line VII—VII of Figure 4, illustrating the cam mechanism which governs the swinging operation of the body blank transfer arm.

Figure 8 is a vertical detailed view taken on line VIII—VIII of Figure 1 and showing the cam mechanisms which govern the swinging operation of the body blank feed arm and the operation of the pneumatic controls forming a part thereof.

Figure 9 is a vertical detailed view taken on line IX—IX of Figure 4, showing the gear mechanisms which control the lowering of the body blank magazine.

Figure 10 is an enlarged top plan view of the body blank carrying magazine with the blanks removed.

Figure 11 is a side elevation of the body blank carrying magazine taken on line XI—XI of Figure 2.

Figure 12 is a fragmentary detailed section taken on line XII—XII of Figure 10.

Figure 13 is an enlarged fragmentary detailed section taken on line XIII—XIII of Figure 4.

Figure 14 is an enlarged detailed section of the body blank transfer mechanism taken on line XIV—XIV of Figure 2.

Figure 15 is a fragmentary detailed plan view of the transfer mechanism taken on line XV—XV of Figure 14.

Figure 16 is an enlarged elevation of the upper portion of the blank transfer control mechanism taken on line XVI—XVI of Figure 5.

Figure 17 is an enlarged top plan view of the body blank adhesive applying pad and tank.

Figure 18 is a vertical detailed section of the glue tank taken on line XVIII—XVIII of Figure 17.

Figure 19 is an enlarged top plan view of the feed mechanisms for glued blanks.

Figure 20 is a longitudinal detailed section taken on line XX—XX of Figure 19.

Figure 21 is an enlarged detailed view taken on line XXI—XXI of Figure 20.

Figure 22 is an enlarged detailed view taken on line XXII—XXII of Figure 20.

As shown on the drawings:

The improved rotary flat-bottomed cup-making machine, which is adapted to produce flat-bottomed cups out of a plurality of blanks, has associated therewith improved mechanisms embodying the present invention and adapted to remove a sector-shaped body blank from a magazine and automatically transfer the blank into the field of operation of an adhesive applying mechanism to permit the blank to be stamped with strips of adhesive before feeding said blank, by means of an improved pneumatic feed device, into a position to be engaged by a forming mandrel of the machine to be shaped therearound to form the body of a flat-bottomed cup.

With the above briefly mentioned operations in mind, it will be seen that the improved machine consists generally of a plurality of associated devices which are supported upon a metal framework comprising a table or platform 1, supported by legs 2. Disposed longitudinally below the table 1 and supported by suitable braces forming parts of the legs 2 is an air exhaust tank 3 (Figure 4), the purpose of which is hereinafter more fully described.

It will be conducive to a clearer understanding of the operation of the machine to describe at this point the character and arrangement of the main driving mechanism. A horizontal drive shaft 4 is journalled in suitable bearings 5, held by brackets 6 mounted on the table 1, and is rotated through a clutch 7 adapted to be operated by a conveniently disposed hand lever or the like. Mounted on the shaft 4 for co-action with the clutch 7 is a large driving gear 8 which meshes with a driving pinion 9 mounted on one end of the shaft 10 of a driving motor 11. The motor 11 is supported by a bracket 12 secured to the rear side of the machine framework (Fig. 1). A hand wheel 13 is secured near the forward end of the main shaft 4. Mounted on the rear end of the main shaft 4 is a sprocket, around which an endless chain 14 is trained. The chain 14 is connected to drive a rotary exhaust pump 15 which is connected by means of a pipe 16 to the air exhaust tank 3.

An auxiliary horizontal cam shaft 17 is journalled in bearings 18 on the brackets 6 and in a bearing bracket mounted on the table 1. A pinion 19 on the shaft 4 is in mesh with a large gear 20, on the shaft 17, thereby causing the shaft 17 to be continuously rotated. A horizontal central shaft 21, mounted in bearings 22, is intermittently rotated by the cam shaft 17 by means of Geneva gears 23 and 24. During the rotation of the main shaft 4, continuous rotation will be imparted to the cam shaft 17 and to the shaft of the pump 15, while a central shaft 21 is intermittently rotated from the cam shaft 17.

The various operations of forming flat-bottomed cups are focused about a spider, or turret-head, which is keyed to the central shaft 21 for intermittent rotation therewith. The turret-head comprises a plurality of integrally connected radially directed arms or spokes 25. Each of the arms 25 is provided with a bearing stud upon which is mounted a rotatable frustum-shaped cup former, or mandrel, 26. Each mandrel 26 is provided with a plurality of gripper apertures or openings 27 disposed in a longitudinal row. The mandrel apertures 27 are connected through suitable passages to a vacuum control plate 28 (Fig. 2), which is loosely mounted on the shaft 21 against the back face of the turret-head and is suitably passaged to register with the passages provided in the turret-head arms 25. A flexible tube or pipe 29 leads from the vacuum plate 28 to the air exhaust tank 3.

The frustum-shaped mandrels 26 are provided with flat outer end surfaces to receive flanged cup-bottom blanks from a cup-bottom blank punching and feeding attachment, designated as a whole by the reference numeral 30 (Fig. 2), the details of which form no part of the present invention and are clearly described in the earlier patent hereinbefore referred to. The apertured forming mandrels 26 are adapted to receive and pneumatically grip cup body blanks at predetermined times and are furthermore subject to rotation on their supporting studs at predetermined times and to translation periodically from one position to another in a circular path by reason of the rotation of the central shaft 21. The rotary forming mandrels 26 are adapted to assume different positions, such as A, B, C, etc., the position A being that in which a mandrel is adapted to receive and pneumatically grip a cup body blank as hereinafter more fully described.

Mounted on the machine framework in suitable bearing brackets 31 is a transfer cam shaft 32. The cam shaft 32 carries a bevel gear 33 which meshes with a bevel gear 34 fixed on the front end of a longitudinally disposed cam shaft 35. The shaft 35 is driven by an endless chain 36 which is trained around sprocket wheels carried by the shaft 35 and the shaft on which the gear 20 is supported.

Having briefly described the main driving parts of the machine, the apparatus for supporting, feeding and gluing a cup body blank will now be described.

Rigidly secured to the front right hand corner of the table 1 is an extension board or auxiliary table 37. Positioned adjacent the front edge of the table 37 is a magazine supporting post or sleeve 38 having an integral arm 39 which is rigidly secured to the upper surface of the auxiliary table 37. Mounted upon the upper end of the sleeve 38 is a flat plate or head 40, to which a magazine base plate 41 is rigidly fastened.

Secured upon the top of the base plate 41 are a plurality of stationary guide arms 42 and a pair of adjustable guide arms 43, which are adjustable in guide slots 44 provided in the base plate 41. Also mounted upon one corner of the base plate 41 is a stop arm 45 which is slightly higher than the guide arms 42 and 43 and carries an adjustable stop screw 46. The screw 46 serves as a stop to limit the swing of a cup blank transfer frame 47 hereinafter more fully described.

Each of the blank guide arms 42 and 43 is provided with a smooth liner plate 48 fastened at the lower end to the respective guide arms and having the upper end free to be adjusted by means of a set screw 49. The liner plates 48 serve to control the upward movement of a blank supporting plate 50 by the frictional engagement between the stack of blanks and said liner plates 48, the upper ends of which are adapted to be deflected inwardly by the screws 49.

Positioned above the magazine base plate 41 is the movable false bottom or cup-blank supporting plate 50, which is shaped as illustrated in Figure 10 to slide upwardly and downwardly between the guide arms 42 and 43. The false bottom is adapted to carry a stack of cup body blanks 51 which are of segment shape, as illustrated in Figure 2. The blank carrier plate 50 is secured upon the upper end of a post or rod 52. A pin 53 (Fig. 5) projects from the post 52 and slides in a longitudinal slot 54 provided in the sleeve 38. The post 52 is slidable through the sleeve 38 and passes upwardly through an opening 55 in the base plate 50. Connected to the lower end of the post 52 is one end of a control spring 56 (Fig. 5), the upper end of which is secured to the bottom of the auxiliary table 37 and normally acts to raise the blank carrier plate 50 and the stack of cup blanks carried thereon to permit the uppermost cup body-blank in the stack to be delivered against a blank transfer mechanism hereinafter described.

Secured around the post 52 is a collar or sleeve 57 having a slot in one side thereof to permit an eccentric disc 58 to co-act with the post at predetermined times to pull the same downwardly against the action of the spring 56. The disc 58 is supported on a stub shaft 59 carried by a pair of brackets 60 fixed on the sleeve 57. Fixed on one end of the stub shaft 59 is a crank arm 61 to which one end of a connecting link 62 is pivotally connected (Fig. 11). The other end of the link 62 is pivoted to a toggle arm 63 which slidably projects through a slot 64 (Fig. 3), formed in a guide bracket 65 secured to the auxiliary table 37.

A pin 66 projects through the slot 64 and serves as a fulcrum for the free end of the toggle arm 63. The second end of the toggle arm 63 is pivoted to one end of a crank arm 67, the other end of which is fixed on one end of a shaft 68, journalled in bearing brackets 69 and 70 supported on the auxiliary table 37. Secured on the shaft 68 adjacent the bearing bracket 70 is a crank arm 71 (Fig. 4), which is pivoted to one end of a connecting rod 72 having a turnbuckle 73 intermediate the ends thereof to permit adjustment of the connecting rod. The other end of the connecting rod 72 is pivoted to a crank arm 74 secured on a shaft 75 journalled in a bearing bracket 76 supported beneath the table 1. A Geneva gear 77 is fixed on the shaft 75 (Fig.

9) and co-acts with a Geneva gear 78 fixed on the cam shaft 35 to receive a drive therefrom.

From the cup body blank carrying magazine the body blanks 51 are adapted to be removed one at a time from the top of the stack. This operation is performed automatically at predetermined times by means of a blank transfer mechanism, comprising a control cam 79 (Fig. 4) fixed on the cam shaft 35 and co-acting with a roller 80 (Figs. 4 and 7), carried on one end of a yoke bar 81. The yoke bar 81 is provided with a slot 82 through which the cam shaft 35 projects. The other end of the yoke bar 81 is pivotally connected to a yoked member 83 having a telescoping engagement with a second yoke member 84.

The two yoked telescoping members 83 and 84 are connected by a cushioning spring 85 positioned between the yoked heads of said members. The head of the yoked member 84 is pivoted to a lower bell-crank arm 86 fixed or integrally formed on the lower end of a bell-crank sleeve 87 (Fig. 7), which is mounted on a vertical shaft 88 fastened to one corner of the table 1. An upper bell-crank arm 89 is integrally formed on the upper end of a long connecting rod 90 pivoted thereon. The other end of the connecting rod 90 is pivoted to a crank arm 91 (Fig. 4) having one end thereof pinned to the lower end of a tubular vertical shaft 92 (Fig. 14) which projects upwardly through a supporting sleeve 93 provided with an integral bracket 94 rigidly secured to the auxiliary table 37. Seated upon the upper end of the supporting sleeve 93 and engaged around the shaft 92 is a collar 95 having an air outlet passage 96 therein, into one end of which an air exhaust pipe 97 projects.

An air control valve 98 is provided in the pipe 97 and has a valve control lever 99 forming a part thereof. Connected to operate the valve control lever 99 is one end of a link 100, the other end of which is pivoted to the upper end of a slide plate 101 (Fig. 16). The plate 101 is slidably mounted in a guide groove provided in a guide bracket or extension 102 formed on one side of the supporting sleeve 93. Attached to the slide plate 101 is the upper deflected end of a slotted connecting bar 103, the lower end of which carries a roller 104. The roller 104 co-acts with the periphery of a control cam 105 fixed on the cam shaft 32. The air pipe 97 projects through the table 1 and connects up with a main control valve 106 (Fig. 4) mounted in an air main 107 leading to the air exhaust tank 3. A valve stem 108 is connected with the valve 106 to permit manual control thereof.

Rotatably engaged around the shaft 92 above the collar 95 is a flanged sleeve 109 having an air groove 110 formed in the bottom face thereof (Fig. 14). The groove 110 communicates with the air outlet passage 96. Also communicating with the groove 110 is one end of an auxiliary air exhaust pipe 111 which projects upwardly through an opening 112 provided in an arm 113 integrally formed on the upper end of the hollow shaft 92. A spring 114 is coiled around the upper end of the sleeve 109 and seats against a washer 115 on the shaft 92 beneath the arm 113. The auxiliary air exhaust pipe 111 also connects up with an opening in an apertured plate 116, supported on the cup blank transfer yoke or frame 47, which is fixed on the end of the arm 113 (Fig. 15).

Hinged to one edge of the plate 116 (Fig. 5), is a hollow cup blank transfer block 117 shaped substantially the same as the plate 116 and having a plurality of apertures 118 in the bottom face thereof. The blank transfer block 117 is also provided with an air exhaust opening 119 in the top wall thereof adapted to register with the end of the auxiliary air exhaust pipe 111 when the block 117 is in closed position, contacting the supporting plate 116, as illustrated in Fig. 14. Secured to the blank transfer block 117 is one end of a handle rod 120 which is journalled in a depending end of a bracket 121 secured upon the arm 113. A spring 122 is engaged around the rod 120 between the bracket 121 and a sleeve 123, and normally acts to hold the block 117 in contact with the plate 116.

Formed on the end of the sleeve 123 is a cam arm 124 which co-acts with a pin 125 carried on one end of an arm 126 secured on the upper end of a rod or stem 127 which is slidably mounted within the hollow shaft 92. The lower end of the stem 127 projects from the shaft 92 and seats against a shoulder 128 formed on one end of a crank arm 129. The crank arm 129 is fixed on a shaft 130 journalled in a bearing bracket 131 secured to the bottom of the auxiliary table 37 and in a bearing supported on one of the front legs 2 of the machine. Mounted on one side of the crank arm 129 is a flanged roller 132 which rides on the periphery of a control cam 133 carried on the cam shaft 32. As illustrated in Fig. 16, the sleeve 109 carries a pin 134 which projects into a slot formed in a bracket plate 135 integrally formed on an apertured disc 136 secured upon the top of the arm 113. With this arrangement, the sleeve 109 will rotate with the arm 113 and the shaft 92.

The apparatus just described is for the purpose of gripping the uppermost body blank in the blank holding magazine and transferring the removed body blank into a position over an adhesive applying mechanism which will now be described.

The removed blank is held by the gripper block 117 beneath the transfer frame 47 over the adhesive applying mechanisms, as illustrated in Fig. 2. The adhesive applying mechanisms comprise an adhesive or glue supply tank 137 having a plunger pot 138 integrally formed on the bottom thereof and communicating with the interior of said tank through an opening 139. The glue tank plunger pot 138 is provided with base flanges 140 which are rigidly secured to the top of the auxiliary table 37. Secured in the glue plunger pot 138 is a pair of guide posts 141 which project upwardly into the tank 137, as illustrated in Figures 17 and 18. Slidably engaged on the posts 141 is a double cylinder plunger 142 having a plate 143 secured or formed on the upper end thereof within the tank 137. Formed on two edges of the plate 143 are a straight adhesive applying pad 144 and a curved pad 145.

Pivoted to the lower end of the plunger 142 is the lower end of a link 146, the upper end of which is pivoted to the inner angled end of a lever 147. The lever 147 is fulcrumed intermediate its ends on a pin 148 supported in bearing lugs 149 formed on the upper edge of the tank 137. Pivoted to the outer portion of the lever 147 and operable thereby is the upper end of a connecting rod 150, the lower end of which is pivoted to one end of a control bar 151. The bar 151 is integrally formed on a sleeve 152 loosely engaged on a shaft 153 supported in bearing brackets 154 and 155 mounted on the under face of the auxiliary table 37 and the table 1 respectively. The outer or forward end of the control bar 151 is notched (Fig. 3) to co-act with the end of a stop bracket 156 secured to the under face of the auxiliary table 37 to limit a rebounding upward movement of the adhesive applying pads 144—145 after the bar 151 has first been actuated as hereinafter described.

Also pivotally connected to the lever 147 is the upper end of a telescoping connecting member 157 having a coiled spring 158 covering and connecting the telescoping parts. The lower end of the telescoping member 157 is pivoted to one end of a lever 159, the other end of which is rotatable on the shaft 153 adjacent the sleeve 152. Rigidly secured on the shaft 153 adjacent the lever 159 is a crank arm 160. The free end of the crank arm 160 is provided with a pair of lugs 161 carrying adjustable set screws 162 which contact the side edges of the lever 159 to permit adjustment of the adhesive pad operating mechanisms. The spring-connected telescoping member 157 serves to cause the adhesive pad to be operated against a blank with a resilient or cushioning action.

The shaft 153 projects through a sleeve 163 positioned between the bearing bracket 155 and a bearing bracket 164 secured to the table 1 (Fig. 9). Fixed on the end of the shaft 153 to the outside of the bearing bracket 155 is a crank arm 165 to which the lower end of a rod 166 is pivotally connected. The upper end of the rod 166 projects above the edge of the table 1 and is secured to a channel yoke or union 167 which carries a pivot bolt 168 (Fig. 9). Pivoted on the bolt 168 is the lower end of a bar or arm 169 (Figs. 1 and 9), having a slot therein through which the cam shaft 17 projects. A roller 170 on the upper end of the arm 169 co-acts with the periphery of an adhesive pad control cam 171 fixed on the cam shaft 17.

After the adhesive applying mechanism has been actuated to apply a straight and a curved strip of adhesive to the under surface of the transferred body blank 51, held by the gripper block 117 in the position illustrated in Fig. 2, the control cam 133 moves into the position illustrated in Figure 14, thereby permitting the stem 127 to drop by gravity, causing the pin 125 to act on the cam arm 124 to swing the gripper block 117 downwardly away from the plate 116 to break or release the vacuum or suction action in the gripper block 117. The glued body blank is thus automatically released by the transfer mechanism and delivered to a cup body blank feed mechanism, which will now be described.

The cup body blank feed mechanism comprises a blank receiving head or block 172 having a plurality of inter-connected passages 173 therein, as illustrated in Figures 19 and 20. The top wall of the feed head 172 is provided with two rows of apertures 174. A curved slot 175 is provided in the blank feed head 172 for the purpose of receiving a blank centering lever (not shown). An extension arm 176 is integrally formed on the feed head 172 and is secured to the outer end of a swinging arm 177 having a passaged supporting shank 178 formed on one end thereof and provided with angled air passages 179 and 180 which open up through the top of said shank and through opposite sides thereof. A pipe 181 connects the side opening of the shank air passage 179 with a passage 182 in the outer end of the arm 177. Connected in the side opening of the passage 180 is one end of an elbow pipe 183, to the other end of which an air exhaust pipe or tube 184 is connected (Fig. 2). The tube 184 passes downwardly through an opening in the table 1 and connects up with a pipe 185 (Fig. 4), leading to a control valve 186 adapted to be operated manually by means of a valve stem or valve control rod 187. The control valve 186 connects up with the main air exhaust pipe 107 leading to the air exhaust tank 3.

The shank 178 of the feed arm 177 has a hollow or passaged shaft 188 integrally formed thereon with said shaft projecting downwardly through a bearing sleeve 189 formed on a bracket 190 fixed on the top of the table 1. Secured rigidly to the projecting end of the hollow shaft 188 is a crank arm 191 having a threaded bolt extension 192 formed thereon. A yoked connector 193 is pivoted on the bolt extension 192 between retaining nuts. Connected to the connector 193 is a connecting rod 194, the inner end of which is pivoted on the upper end of a fulcrumed bar 195 (Fig. 8), projecting through an opening 196 in the table 1 and supported on a bracket secured to the under surface of said table. A roller 197 is carried on the lower end of the fulcrumed bar 195 and has rolling contact with a feed arm control cam 198 secured on the cam shaft 35.

Rotatably seated upon the passaged shank 178 (Figs. 19, 20 and 22) is an air exhaust control valve 199 having a diametric passage 200 therein connecting two arc-shaped passages 201 and 202 in the lower face thereof, co-acting respectively with the air passages 180 and 179 of the arm shank 178. Integrally formed on the valve 199 is a valve stem 203. The valve 199 is also provided with an air release port or aperture 204. The valve stem 203 projects downwardly through the hollow shaft 188 and has a crank arm 205 fixed on the lower end thereof. The crank arm is positioned to be actuated by a finger or lever 206 fixed on a stub shaft 207 journalled in bearings 208 rigidly fastened to one of the side edges of the table 1. Also fixed on the stub shaft 207 is a crank arm 209 to which one end of a connecting rod 210 is pivotally connected. Formed on the other end of the rod 210 is a yoked or forked member 211 which is slidably engaged over the shaft 35 (Fig. 8). A roller 212 is carried by the rod 210 and co-acts with an air-valve control cam 213 fixed on the shaft 35. A return spring 214 for the valve 199 and cam roller 212 is connected between the bracket 190 and an arm 215 (Fig. 20), formed on the hub of the crank arm 205.

As a glued blank is released by the transfer block 117, the blank feed head 172 is positioned beneath the glued blank, and the control valve 199 is so positioned that a suction action is produced in the feed head to cause the released blank to be pneumatically gripped by said feed head. At this stage in the making of a cup, the feed arm 177, controlled by the cam 198, is swung from the position illustrated in Figure 2 inwardly toward the cup forming mandrel 26 in position "A."

The blank feed head 172 is adapted to hold and carry the glued blank into the plane of the upper element of the conical frustum-shaped mandrel at station "A" and said upper element of the mandrel contains the row of pneumatic gripper openings 27, as illustrated in Figure 2. The advance end of the glued cup blank is now positioned over the row of apertures 27 and beneath a raised pressure shoe 216 carried by an arm 217 pivoted to a spoke of a four-arm sprocket wheel or spider which is fixed on the shaft 21. The arm 217 carries a roller which co-acts with the periphery of an auxiliary pressure shoe control cam 218.

At this stage in the formation of a cup, the feed arm control valve 199 is operated to move the slots 201 and 202 out of register with the air passages 180 and 179, respectively, to break off the connection with the air exhaust tank 3. When the valve 199 is operated, the inlet port 204 is moved into register with the passage 179 (Fig. 20), thereby breaking the vacuum or suction action within the feed arm pipe 181 and the feed arm head 172. The cup blank on said head is thus released after it has been delivered into contact with the mandrel 26 in position "A." At the time the glued blank is released by the feed head 172 a suction action is produced in the mandrel 26 in position "A", thereby causing the glued cup blank to be pneumatically gripped or affixed by suction to said mandrel in an exact predetermined relation thereto. The mandrel 26, carrying the cup blank, is now adapted to be advanced through an arc of 90° by means of the Geneva gears 23 and 24 (Fig. 1), thereby causing said blank to be carried ahead by the forming mandrel into position "B" ready to be wound or formed around said mandrel to form a paper cup body.

The various mechanisms for conducting a glued body blank through the machine to be formed around a cup bottom to cause the forming of a flat-bottom cup will not be described herein, since said mechanisms form no part of the present invention and are clearly illustrated and described in applicant's earlier patent hereinbefore mentioned.

The operation is as follows:

In connection with the detailed description of the various auxiliary mechanisms comprising attachments or parts of the flat-bottom cup forming machine of this invention, a somewhat detailed description of the operation of the respective mechanisms has already been given. It will, therefore, be necessary to give only a brief resumé of the operation of the main driving mechanisms of the machine in combination with the body blank transfer mechanisms, gluing device and feed mechanisms, which embrace the features of the present invention.

To start the machine, a control lever or the like is operated so that a drive from the motor 11 is transmitted to the main shaft 4 and then to the auxiliary mechanisms comprising the machine.

The cup body blanks 51 are supported in the magazine 41—43 upon the false bottom 50, which is adapted to be raised by the action of the spring 56 to position the uppermost cup body blank against a blank transfer device. The false bottom 50 is held in place by the frictional engagement of the edges of the stack of blanks with the liner plates 48. The uppermost cup body blank 51 is now adapted to be removed from the top of the stack due to the action of the control cams 79, 105 and 133 (Figs. 4, 5 and 14).

The cam 79 acts to cause the blank transfer plate 117 to swing at a predetermined time from the position illustrated in Figure 2 into a position, limited by the stop screw 46, above the blank-carrying magazine in time to permit the uppermost blank 51 to be moved into engagement therewith when the magazine bottom 50 is raised. The control cam 105 now acts to cause operation of the air valve 98 to connect the blank transfer block 117 with the air exhaust tank 3. The air is thus exhausted from the block 117, thereby causing the uppermost blank in the magazine to be gripped by suction to the under face of the blank transfer block 117.

At this stage in the operation, the spring 85, which was tensioned, due to the action of the cam 79, on the roller 80, now acts to actuate the bell-crank 86—89 and the rod 90 to swing the blank transfer block 117 back into the position illustrated in Figure 2. The gripped body blank 51 is thus transferred from the blank magazine into position over the glue applying mechanism in the glue tank 137.

The glue applying control cam 171 on the cam shaft 17 now acts on the roller 170 to rock the shaft 153, thereby pivoting the arms 160 and 159 downwardly to actuate the telescoping connecting member 157. The outer end of the lever 147 is thus pulled downwardly, causing the submerged glue applying pad 144—145 to be raised and resiliently pressed or stamped against the under face of the cup body blank 51, which, in turn, is pressed upwardly against the under faces of the curved and straight arms of the transfer frame 47. Any upward rebound movement of the glue pad which might occur due to the action of the spring 158 is limited by the stop bracket or arm 156 (Fig. 3) by having the notched end of the bar 151 come into contact with said stop bracket. A straight and a curved strip of glue is thus stamped or applied to the under surface of the cup body blank 51. The gripping surface of the suction block 117 is sufficient to hold a cup blank against the bottom of the transfer frame 47 without any appreciable sag at the trailing end of the blank.

The suction release control cam 133 now reaches the position illustrated in Figure 14, thereby permitting the raised stem 127 to drop by gravity, causing the pin 125 to actuate the cam arm 124 to swing the gripper block 117 downwardly about its hinges away from the plate 116. The vacuum or suction action in the block 117 is thus broken or released. The glued cup body blank is thereby automatically released and is permitted to be delivered to the cup body blank feed head 172, positioned as illustrated in Figure 2.

Referring now to Figures 8 and 20, the control cam 213, governing the air valve mechanism of the blank feed arm, now co-acts with the roller 212 to cause the rod 210 to actuate the lever 206, thereby causing the crank arm 205 to rock the shaft 203 and move the valve 199 into open position to cause an air suction action to take place in the apertured feed arm head 172. The glued cup body blank released from the transfer block 117 is thus pneumatically gripped by the cup blank feed head 172, ready to be fed into the machine for forming.

The feed arm control cam 198, at this stage in the operation, now co-acts with the roller 197 to operate the fulcrumed bar 195 and the connecting rod 194. The arm 191 is thereby rocked to partially rotate or rock the hollow shaft 188 to swing the feed arm 177 and the blank carrying head 172 from the position illustrated in Figure 2 toward the forming mandrel 26 in station "A."

The blank feed head 172 is adapted to carry the glued cup body blank into the plane of the upper line or element of the frustum-shaped mandrel 26 so that the advanced edge or margin of the glued blank is positioned over the row of air suction apertures 27 and beneath the raised pressure shoe 216. The pressure shoe 216 at station "A" is raised, due to the action of the cam 219.

The valve control cam 213 (Fig. 8) now acts to operate the valve 199 to move the slots 201 and 202 out of register with the air passages 180 and 179, respectively, thereby breaking the air suction action in the feed head 172, since the free air port 204 now is in register with the passage 179. The glued cup blank is thus released by the feed head 172 after having been moved into contact with the forming mandrel 26 in station "A" and said feed head is then automatically moved back into the position shown in Figure 2, ready to receive another cup body blank.

At the time a cup body blank is fed to the mandrel 26 in position "A," suction valve control mechanisms, forming a part of the machine, are brought into operation by suitable control cams to cause a suction action to be created in the mandrel 26 in position "A" to cause the glued cup blank, when released by the blank feed head 172, to be pneumatically gripped or attracted by suction to said mandrel in a predetermined relation thereto.

The glued cup body blank delivered to the mandrel in position "A" is now ready to be conducted through the machine and formed around the mandrel and around a flanged cup bottom blank on the end of said mandrel, to form a cup body, which, together with the cup bottom blank, form a flat-bottom paper cup, which is automatically discharged from the machine, counted and then stacked with other cups previously formed. The above mentioned operations are not covered in detail in this case, since they form no part of the present invention and are specifically described in applicant's earlier patent hereinbefore mentioned.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In an apparatus for applying adhesive to blanks, a vertically movable adhesive applying means, a laterally movable transfer arm including suction means for conveying a blank from a source of blanks and holding it in a substantially horizontal position above said adhesive applying means, means for actuating said adhesive applying means to apply adhesive to said blank, a second transfer arm movable into a position below said first mentioned arm and means for relieving the suction on said blank whereby it may be received by said second arm to be removed from said position.

2. In an apparatus as defined in claim 1 wherein the second arm includes a suction head for receiving and gripping the blank.

In testimony whereof I have hereunto subscribed my name.

HAROLD CARLE.